Jan. 8, 1946.　　　R. F. DIRKES ET AL　　　2,392,369
TELEGRAPH PRINTER
Filed Feb. 9, 1940　　　3 Sheets-Sheet 2

INVENTORS
R. F. DIRKES
T. E. MELICK
BY　V. R. KIMBALL
Morris R. Marsh
ATTORNEY

Jan. 8, 1946.  R. F. DIRKES ET AL  2,392,369
TELEGRAPH PRINTER
Filed Feb. 9, 1940   3 Sheets-Sheet 3
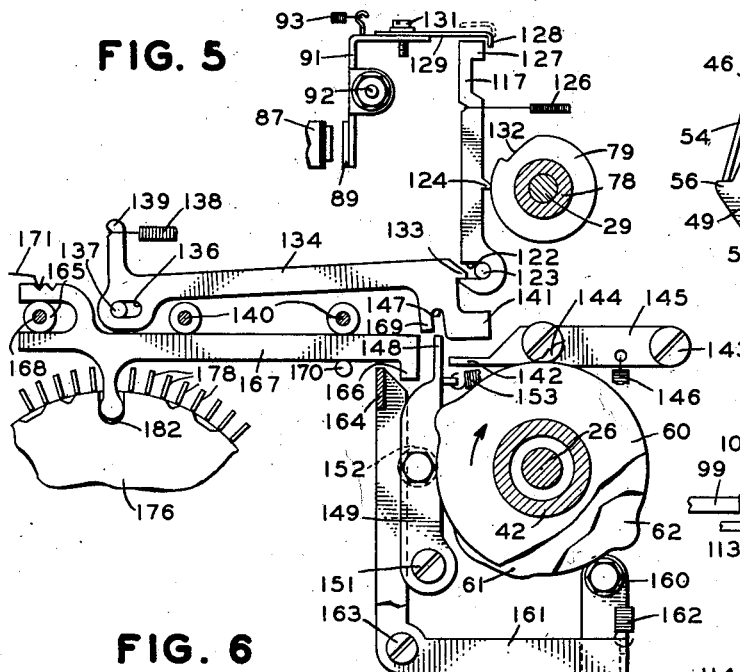
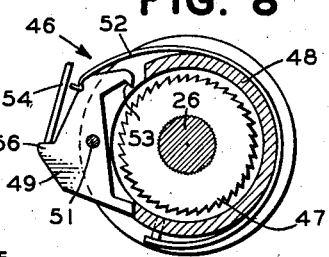
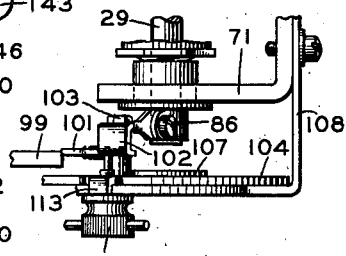
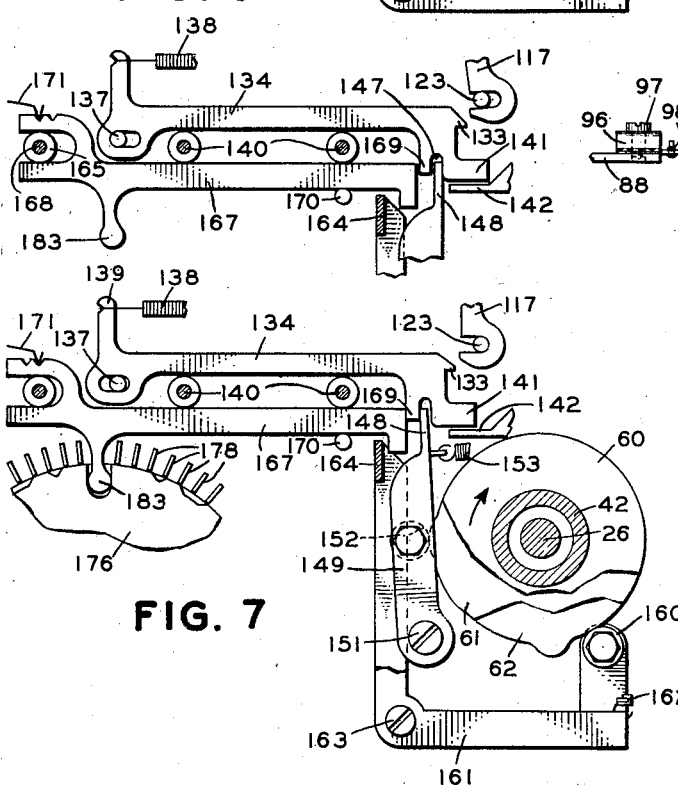
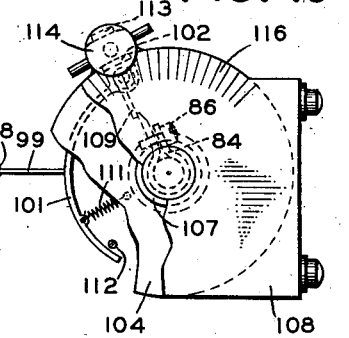
INVENTORS
R. F. DIRKES
T. E. MELICK
V. R. KIMBALL
BY Morris R. Marsh
ATTORNEY Patented Jan. 8, 1946

2,392,369

UNITED STATES PATENT OFFICE 2,392,369

TELEGRAPH PRINTER

Robert F. Dirkes, Jamaica, N. Y., and Thomas E. Melick, Neshanic, and Vernon R. Kimball, Union City, N. J., assignors to The Western Union Telegraph Company, New York, N. Y., a corporation of New York Application February 9, 1940, Serial No. 318,021

26 Claims. (Cl. 178—34)

The present invention relates primarily to printing telegraph apparatus and more particularly to printing telegraph receiving instruments wherein characters representative of received code groups of signals are printed upon a receiving medium such as a tape.

The principal object of the invention is to provide a receiving printing telegraph instrument or receiver which is reliable, quiet and efficient in operation, capable of operating at a high rate of speed and which may be easily and cheaply manufactured and maintained. In accordance with the above the design of the receiving instrument is such that a minimum number of parts are required and a large percentage of the parts employed are such that they may readily be made either from stampings or on automatic screw machines. Although some of the parts or elements require machining thereon at certain points the design thereof is such that the machining is a minimum. Also the location of various elements and sub-combinations thereof of the machine is such as to require a minimum number of interconnecting elements.

In keeping with the object of the invention only two operating sleeves are employed, a selector cam operating sleeve and an operating cam sleeve, and these are disposed parallel to one another in order to enable the employment of simpler driving means therefor other than what is generally required where such sleeves are at angles to one another. Other such arrangements, and including a simplified orienting device comprising a minimum number of easily manufactured elements, permit the construction of a simplified receiver in accordance with the invention as will be apparent hereinafter.

The receiver or printer operates on what is known in the art as the start-stop principle. Where start-stop signals are employed, the intelligence impulses are usually in groups or permutations of a given number, usually 5, and each group of intelligence impulses is preceded by a start impulse of one line condition and followed by a rest or stop impulse of the opposite line condition to the start impulse. The function of the start and stop impulses is to maintain synchronism between the receiving printer and the source of signals. The start impulse initiates the operation of the receiver for one cycle at the beginning of a code group and the stop impulse stops the same at the end of the cycle. The permutations of variable impulses received between the start and stop impulses control the printer in accordance therewith to perform its various functions.

In the preferred embodiment of the invention a group of selector latches is employed, one for each of the five variable impulses in a code group. The latches have two paths of movement and which path of movement a latch is operated through in a cycle of operation is determined by the condition of the associated signaling impulse. Cams operating in timed relation to the received impulses time the operation of the latches. In one path of movement of the latches they pivot idly about one end, whereas in the other path of movement they pivot about the opposite ends and in doing so unlatch associated selectors. The selectors associated with the latches selectively operated are thereupon allowed to move from their normal unselected position to selected operated positions. The selectors thus assume settings in normal and selected positions representative, according to a predetermined arrangement, of the received code group. Following the selective operation of the selectors a transfer bail operated by an individually associated cam transfers the settings of the selectors to a set of transfer bars. The transfer bars in turn control a type wheel stop unit which selectively stops the type wheel in any one of a plurality of angular positions. Following the transfer operation, a resetting bail operated by an associated cam returns the selectors in selectively operated positions to their normally unoperated latched positions where they are again in condition to be operated in response to the next code group. Various other operations incident to a cycle of operation of the receiver are performed during the above mentioned functions and in timed relation therewith as timed by their associated cams. These functions will be apparent hereinafter in connection with the detailed description of the invention.

A more thorough and complete understanding of the invention may be had from the following detailed description when taken in conjunction with the accompanying drawings in which:

Fig. 5 is a view showing the relative location and arrangement of a selector latch, a selector, a transfer bar, and the various operating bails therefor;

Figs. 6 and 7 are views similar to Fig. 5 showing the elements thereof in operated positions;

Fig. 8 is a sectional view of a clutch employed to rotate the operating cam sleeve taken substantially on line 8—8 of Fig. 2;

Fig. 9 is a fragmentary plan view of the orienting mechanism which is employed to stop the selector shaft in variable positions according to the setting of the orienting mechanism;

Figs. 10 and 11 are front and left hand elevational views respectively of the orienting mechanism shown in Fig. 9; and Fig. 12 is a timing chart of the various cams on the operating cam sleeve.

Figure 2:
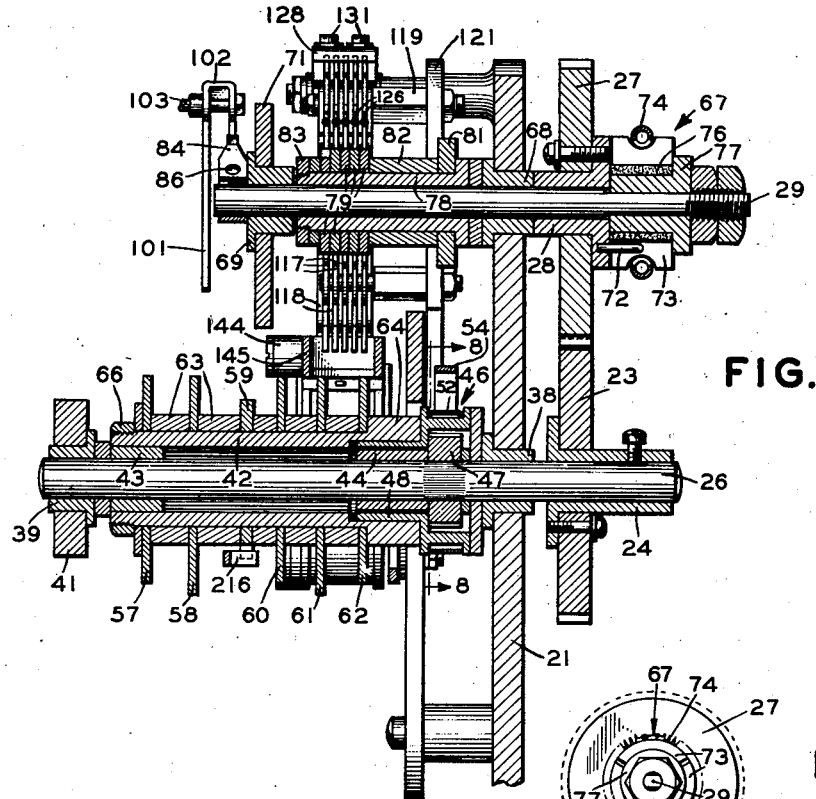
Fig. 2 is a fragmentary sectional view taken through the center and along the axis thereof of the selecting and operating cam sleeves.
Figure 3:
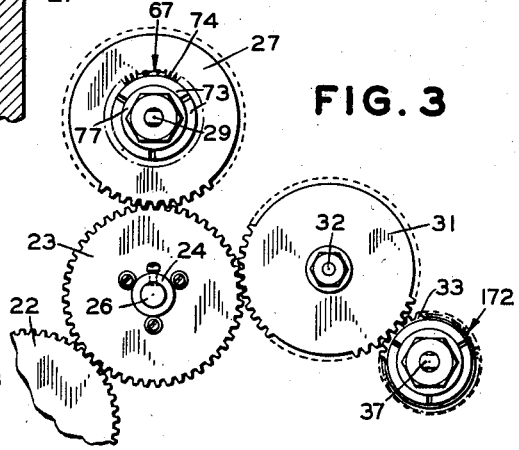
Fig. 3 is a schematic arrangement of the gears employed to rotate the various shafts.
Figure 4:
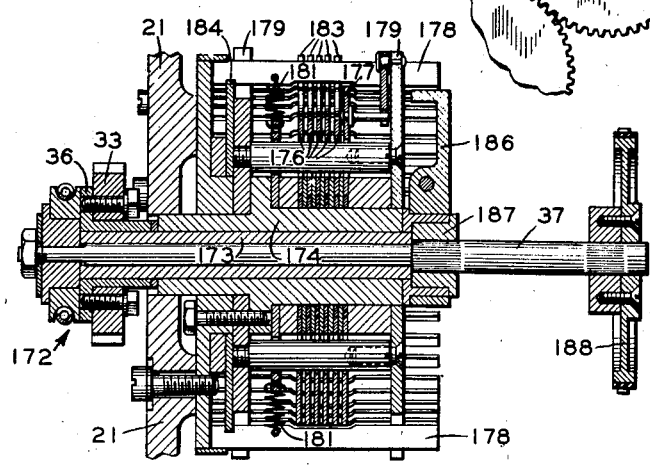
Fig. 4 is a longitudinal sectional view taken through the center of the type wheel stop unit.

Referring first to Figs. 2 and 3, a frame member 21 suitably supported in a vertical position serves as a main support of the various elements and combinations of the printer. The frame 21 has a horizontal section, not shown, at the bottom thereof upon which is mounted the driving motor, also not shown, from which is derived the power for operating the receiver. Driven from the motor and adapted to be constantly rotated thereby is a gear 22 which meshes with another gear 23 mounted on a collar 24, which in turn is secured to an operating shaft 26. The gear 23 meshes with a selector shaft gear 27 located thereabove which is secured to a collar 28, loosely mounted on the selector shaft 29. An idler gear 31 pivotally mounted on a stud 32 in the frame 21 meshes with the gear 23 and a stop unit driving gear 33. The stop unit driving gear 33, Fig. 4, is secured to a collar 36 which in turn is loosely mounted adjacent the left hand end of the type wheel stop unit shaft 37. The manner in which the various shafts serve to operate their associated mechanisms will hereinafter be pointed out.

The operating shaft 26, Fig. 2, is journaled adjacent the right hand end thereof in a bushing 38, supported in the frame 21 while the left hand end of the shaft is journaled in a bushing 39 supported in a bracket 41, which is secured to the frame 21 by means not shown. An operating cam sleeve 42 is loosely mounted by means of bushings 43 and 44 in the ends thereof on the operating shaft 26. The operating cam sleeve 42 is rotated from the operating shaft 26 through a positive action or grab clutch indicated in general by reference numeral 46. The driving element of the clutch 46 comprises a ratchet 47 forced on the constantly rotating operating shaft 26 for rotation therewith while a recessed member 48, Figs. 2 and 8, comprises the driven member of the clutch. The recessed member 48 is adapted to rotate with the operating cam sleeve 42 and carries a ratchet dog 49 pivotally mounted on a pin 51 therein. A flat spring 52 secured to the outside of the recessed member 48 normally tends to pivot the ratchet dog 49 in a clockwise direction, as shown in Fig. 8, to bring a point 53 into engagement with the teeth of the constantly rotating ratchet 47. However, the member 48 together with the operating cam sleeve 42 is normally held at rest in their normal rest position by a trip lever 54 engaging a surface 56 of the dog 49 to hold the point 53 out of engagement with the teeth of the ratchet 47. When the trip 54 is actuated in a manner hereinafter described, the ratchet dog 49 is allowed to pivot in a clockwise direction under the action of the spring 52 to engage the point 53 with the teeth of the rotating ratchet 47 whereupon the operating cam sleeve 42 rotates with the shaft 26. The trip lever 54, as hereinafter pointed out, is only momentarily operated, and is thereafter back in its normal position ready to engage the surface 56 and pivot the ratchet dog 49 in a counterclockwise direction to disengage the point 53 from the teeth of the ratchet 47, after one revolution of the operating cam sleeve 42. Thus each time the trip lever 54 is actuated the operating cam sleeve 42 is released for one and only one revolution at a time.

Mounted on the operating cam sleeve 42 from left to right, Fig. 2, is a print cam 57, a feed cam 58, a notched cam or disc 59 for prevented rotation of the sleeve in a reversed direction, a selector resetting cam 60, a selector transfer cam 61 and a transfer bar resetting cam 62. The above mentioned cams 57 to 62, intermediate with spaces such as 63 are all clamped against a flange 64 at the right hand end of the sleeve 42 for rotation therewith by a nut 66 in threaded engagement with the threaded left hand end of the sleeve 42. Thus, all the above mentioned cams 57 to 62 are clamped in position and are rotatable with the sleeve 42.

As hereinbefore stated, the constantly rotating operating shaft gear 23 meshes with and drives the selector cam shaft gear 27, which together with the collar or hub 28 is loosely mounted on the selector cam shaft 29. The selector cam shaft 29 is normally held at rest in its normal rest position by means hereinafter described and is normally tending to rotate through the action of a friction clutch, indicated in general by reference numeral 67, Fig. 2, located adjacent the right hand end thereof. The friction clutch 67 is shown diagrammatically in Fig. 1. The selector cam shaft 29, Fig. 2, is journaled adjacent its center in a bushing 68 supported in the frame 21 and at the left hand end thereof in a similar bushing 69 in a bracket 71, also supported from the frame 21.

The friction clutch 67 employed to rotate the selector cam shaft 29 comprises a set of pins 72 extending axially from the collar 28. These pins 72 engage radial slots in elements such as Bakelite segments 73 to rotate the same with the collar. A circularly coiled radially contractable spring 74 surrounds the segments 73 and compresses them together with a friction element such as a felt sleeve 76 against the outer periphery of a collar 77. The collar 77 is mounted on a section of the shaft 29, which has flats thereon and is rotatable with the shaft by virtue of the flats. The segments 73, together with the felt sleeves 76, pressing against the periphery of the collar 77 tends to rotate the same, together with the shaft 29, with the gear 27. However, with the shaft held at rest in its normal rest position, the felt sleeve 76 slips around the periphery of the collar 77.

Fixed to the selector cam shaft 29 for rotation therewith, intermediate the two bushings 68 and 69, is a selector cam sleeve 78. Mounted on the cam sleeve 78 are five notched selector cams 79 and a trip cam 81. A spacer 82 separates the trip cam 81 from the selector cams 79 while a nut 83 in threaded engagement with the threaded left hand end of the cam sleeve 78 clamps the selector cams 79 and the trip cam 81 against a flange at the right hand end of the sleeve so that the cams are rotatable with the sleeve. The elements which cooperate with the various cams on the selector cam sleeve will hereinafter be described in detail in connection with the description of these elements. A stop arm 84 clamped to the left hand end of the selector cam shaft 29 by means of a clamping screw 86 is rotatable therewith, and controls the rotation of the typewheel shaft in a manner hereinafter described.

Figure 1:
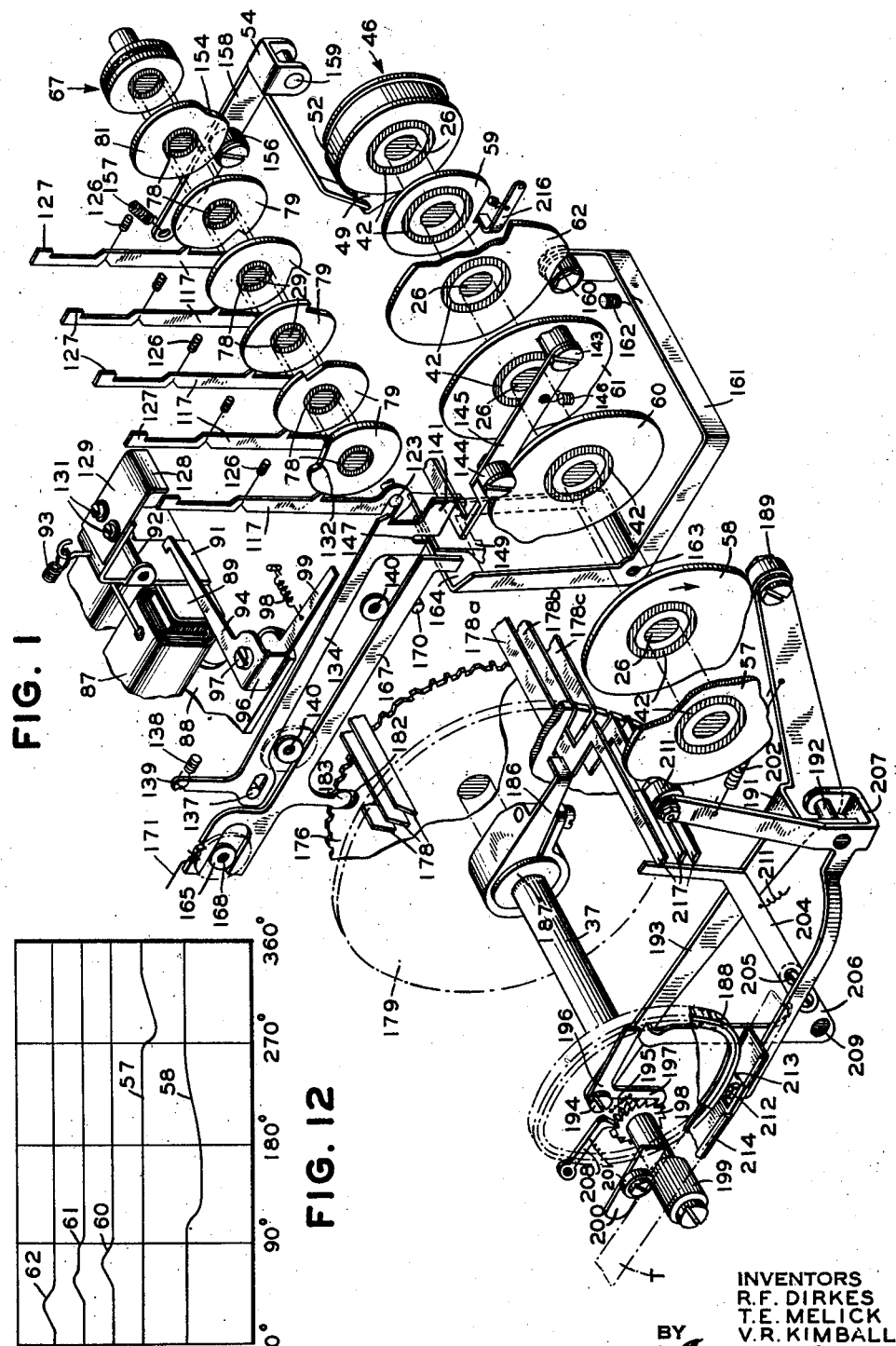
Fig. 1 is an exploded perspective view of some of the principal elements of the invention showing the manner in which these various elements cooperate with one another.

In order to compensate for variations in the start impulses relative to the following intelligence impulse which are due to line or other conditions, an orienting mechanism is employed and such a mechanism as is well known in the art, permits compensating for the variable start impulses in order that the various selector cams cooperate with associated elements, which in the present invention are the above mentioned selector latches, in the midpoint or most effective point of their respective signaling impulses. Primarily this is accomplished by varying the stop position of the selector cam shaft 29. The selector magnet which determines the paths of movement of the selector latches as hereinbefore briefly stated also controls through the instrumentality of the orienting mechanism the release and stopping of the selector cam shaft 29. The selector magnet 87, Fig. 1, comprising two individually wound coils is suitably mounted on a bracket 88 forming a part of the printer frame. Associated with the magnet 87 is an armature 89 secured to the depending portion of an armature lever 91 pivotally mounted on a pivot rod 92. A retractile spring 93 secured to the armature lever 91 normally tends to pivot the same in a counterclockwise direction as shown in Fig. 1 to a so-called retracted position.

In start-stop telegraph systems the line circuit is normally closed during idle or rest periods and accordingly the selector magnet 87 will be energized during such periods to pivot the associated armature lever 91 to its operated position against the action of the attached retractile spring 93. Associated with the front side of the depending section of the armature lever 91 is an arm 94 of a bellcrank 96. The bellcrank 96 is pivotally mounted on a verticle shoulder screw 97 supported in the bracket 88 and a spring 98 attached to the other arm 99 of the bellcrank 96 normally tends to pivot the same in a counterclockwise direction as view from above, to hold the end of the arm 94 in engagement with the front side of the armature lever 91. The springs 93 and 98 work against each other, however, the strength of the spring 93 is so much greater than that of the spring 98 that the spring 98 has little effect on the movement of the armature lever 91. With the magnet 87 energized and the armature lever 91 in its operated position, the spring 98 is permitted to pivot the bellcrank 96 so that the end of the arm 99 thereof is in the path of or in engagement with a curved arm 101, Fig. 9, of a stop gate 102 to block movement thereof. The stop gate 102 is pivotally mounted on a shoulder screw 103 carried in a substantially circular plate 104. A spacer 106 spaces the stop gate 102 from the plate 104 a predetermined distance for reasons hereinafter apparent. The plate 104 is pivotally mounted on a flanged bushing 107 which is carried in a bracket 108 attached to the hereinbefore mentioned bracket 71. The flanged bushing 107 is at the forward end of the selecting cam shaft 29 and concentric therewith. An arm 109, Figs. 10 and 11, of the stop gate 102 is in the path of the end of the stop arm 84 and normally engaged therewith to stop rotation of the selector cam shaft 29. With the stop arm 84 engaged with the arm 109 of the stop gate 102, it tends to pivot the stop gate in a clockwise direction as shown in Fig. 10 but, with the bellcrank 96 in the assumed position, pivoting of the stop gate 102 is prevented, thus the selector cam shaft 29 is held at rest.

Let it be assumed that the start impulse is received on the selector magnet 87 and according to general practice this start impulse is an open line condition. Accordingly, the start impulse allows the spring 93 to pivot the armature lever 91 to its unoperated or retracted position and during such movement of the lever 91 the bellcrank 96 is pivoted a slight amount in a clockwise direction as viewed from above against the action of its attached spring 98. This pivoting movement of the bellcrank 96 moves the end of the arm 99 out of engagement with the arm 101 of the stop gate 102. Thereupon the stop arm 84 is allowed to pivot the stop gate 102 in a clockwise direction as shown in Fig. 10 until the ends of the arm 109 and the stop arm 84 clear one another. At this time a spring 111 attached to the arm 101 of the stop gate 102 pivots the same in a counterclockwise direction until the arm 101 strikes against a stop 112 which places the arm 109 again in the path of the stop arm 84. Thus the stop arm 84 and selector cam shaft 29 are released in response to the start impulse preceding each code group of signals.

The speed of rotation of the selector cam shaft with respect to the code groups is such that it will complete a revolution during the receipt of the rest impulse following the five intelligence impulses. The rest impulse is a closed line condition and accordingly the armature lever 91 will be moved to its operated position allowing the bellcrank 96 to assume its normal position and in this position the end of the arm 99 thereof is in operative relation with the arm 101 of the stop gate 102. Thus, as the stop arm 84 completes its revolution it engages the arm 109 of the stop gate 102 and pivots the same in a clockwise direction against the action of the associated spring 111 until the outer surface of the arm 101 engages the end of the arm 99. Thus the stop arm and selector cam shaft 29 are stopped in response to the rest impulse following an associated code group.

The rotatable plate 104 which carries the stop gate 102 has a lug 113 extending axially therefrom into which is threaded a thumb screw 114. The lug 113 extends beyond the circular upper edge of the bracket 108 and by tightening the thumb screw 114 the rotatable plate may be clamped to the bracket 108. By loosening the thumb screw 114 the plate 104 is movable about the axis of the selector cam shaft 29 and obviously such movement of the plate 104 changes the rest position of the selector cam shaft 29 with respect to its associated elements. A set of indicating marks such as 116 on the bracket 108 cooperate with the thumb screw 114 in order to indicate the amount of movement of the plate 104 when taking a "range." As the plate 104 is moved the end of the arm 99 of the bellcrank 96 maintains the same relationship with the curved arm 101 of the stop gate 102 and is therefore capable of initiating and stopping the rotation of the selector cam shaft 29 for any position within predetermined limits of the plate 104. It will be obvious that the position of the plate 104 may be as readily changed during the receipt of code signals as when the receiver is at rest, the feature of being able to move the plate 104 during the receipt of code signals greatly facilitating the taking of a "range." Thus the rest position of the selector cam shaft 29 may be varied within predetermined limits to enable the selector cams thereon to cooperate with their associated elements during the midportion or most effective portion of their respective signaling impulses. The manner in which the selector cams 79 do cooperate with their associated elements will hereinafter be described in detail.

As shown in Fig. 2, the hereinbefore mentioned selector latches 117 are suitably supported between vertical guide plates such as 118 and associated with respective ones of the selector cams 79. The selector latches 117 and the guide plates 118 are supported on studs such as 119 extending horizontally from a mounting plate 121 supported from the frame 21. The selector latches 117 are in the same vertical plane as associated selector cam 79, and movement thereof in the vertical planes is permitted in the manner hereinafter described.

Referring now to Fig. 1, which shows the selector latches 117 in an exploded arrangement, and Fig. 5, which shows one of the selector latches and associated elements, it will be noted that the latches are disposed in a substantial vertical position and that the lower ends have horizontal bifurcations 122 therein with the openings thereof to the left. A stationary horizontal pin 123 passes through the bifurcations 122 and supports the selector latches 117 thereat. Adjacent the center right hand side of each selector latch 117 is a cam following projection 124, which normally engages the periphery of an associated selector cam 79. Individual springs 126 attached to the selector latches 117 above the projections 124 normally tend to pivot the latches in a clockwise direction about the pin 123 and hold the cam following projections against their associated cams. At the upper ends of the selector latches 117 are rightwardly extending projections 127, which cooperate in a manner hereinafter described with the depending section 128 of a plate 129 attached to the armature lever 91 by screws 131 for movement therewith to determine the paths of movement of the latches.

When the selector magnet 87 is energized the armature lever 91 is positioned, together with the plate 129, so that the depending section 128 is in front of the rightwardly extending projections 127 of the latches 117. Similarly, when the selector magnet is deenergized, the armature lever 91 and plate 129 are positioned so that the depending section 128 is out of the path of movement of the latches 117 as shown by the dot-dash position thereof in Fig. 5.

Each of the selector cams 79 have notches such as 132 therein and the notches in the individual cams are positioned so that they rotate into operative relation with cam followers 124 on associated latches 117 progressively during rotation of the selector cam shaft 29. The selector cam shaft 29 is released as hereinabove described and the orienting mechanism preferably adjusted to allow the notches 132 to engage their associated cam followers 124 during the midportion or most effective portion of their associated signaling impulses.

The lower surfaces of the bifurcations 122 in the selector latches 127 are normally engaged with associated surfaces 133 adjacent the right hand ends of associated selectors 134. The selectors 134 are arranged in substantial horizontal positions and have horizontal slots 136 at the left hand ends thereof, which engage a stationary pin 137 and are supported thereby. Individual springs 138 attached to upwardly extending arms 139 of the selectors 134 tend to pivot the same in a clockwise direction and at the same time tend to move the selectors bodily to the right. The spring thereby keeps the surfaces 133 of the selectors 134 in engagement with the lower surfaces of the bifurcations of the latches 117 and the left hand edges of the horizontal slots 136 against the pin 137.

The two paths of movement of a selector latch 117 in response to the two types of signals received on the selector magnet 187 will now be described. Let it be assumed that the first intelligence impulse received on the selector magnet 87 is an open line condition. Accordingly the plate 129 and armature lever 91 will be positioned to their unoperated position with the depending section 128 of the plate 129 above and out of operative alignment with the rightwardly extending projections of the latches 117. With the plate 129 in this position, the associated spring 126 is allowed to pivot the first selector latch 117 in a clockwise direction about the pin 123 at its lower end as the notch 132 in the first selector cam 79 rotates into operative relation with the cam follower 124. Such pivoting of the latch 117 has no appreciable effect on the associated selector 134 and it therefore remains in its latched or unoperated position. As the selector cam 79 continues to rotate, the notch 132 therein rotates out of operative relation with the cam follower 124 and in doing so cams the selector latch 117 back into its normal position. Thus for open line intelligence impulses the associated selectors 134 remain latched in their normal unoperated positions.

Now let it be assumed that a closed line condition is effective upon the selector magnet 87 during the time one of the notches 132 in a selector cam rotates into operative relation with a cam follower 124 on an associated selector latch 117. For the closed line condition as hereinbefore described the depending arm 128 is in front of the rightwardly extending projections 127 of all of the latches 117. Therefore, as the projection 124 starts to enter the notch 132 in the associated cam under the action of the spring 126, the projection 127 at the upper end thereof engages the depending section 128 of the plate to stop further pivoting thereof in this clockwise direction. At this time the projection 124 will not have entered to the full depth of the notch 132 and as the spring 126 continues to exert a force on the latch 117, it pivots in a counterclockwise direction about the upper end thereof with the projection 127 in engagement with the section 128 serving as a pivot point. During such counter-clockwise pivoting of a latch 117 about the upper end, the lower surface of the bifurcation 122 moves out of engagement with the surface 133 on an associated selector 134. Thereupon the associated selector 134 is permitted to pivot in a clockwise direction by virtue of the biasing effect of its associated spring 138 to a position such as that shown in Fig. 6, which is hereinafter described and referred to as the unlatched selected position of a selector. Some time thereafter the associated latch 117 is pivoted back to its normal position as the notch 132 passes out of operative relation with the cam follower 124. Thus in response to a closed line intelligence impulse a latch 117 is selectively operated to permit the associated selector 134 to assume an unlatched position.

In accordance with the above the five latches 117 are operated in either one or the other of their two paths of movement in response to the opened and closed line conditions effective on the selector magnet 87. Thus in response to a signal group the selectors 134 are selectively operated and assume a setting in a combination of normal latched and unlatched positions representative of the code group.

When the selectors 134 are unlatched as hereinbefore described and move to their selected unlatched positions, they rest on spacing collars or studs 140 with projections 141 on the right hand ends thereof just above a horizontal selector reset bail 142. The bail 142 is carried at the free end of a selector reset lever 145 which is pivoted at its right hand end on a shoulder screw 143 suitably supported in the frame. Adjacent the center of the reset lever 145 is a cam follower 144 in operative relation with the periphery of the hereinabove described selector reset cam 60. A spring 146 attached to the lever 145 holds the cam follower 144 in contact with its associated cam 60. Also formed in the right hand ends of the selectors 134 are vertical bifurcations 147 with the openings thereof at the bottom. In the normal latched position of the selectors the bifurcations 147 are above a vertical transfer bail 148 and out of operative relation therewith. However, when the selectors 134 are unlatched the right hand ends drop down and the bifurcations 147 therein straddle the transfer bail 148 to be operated thereby in a manner hereinafter described. A selector 134 in its latched position is shown in Fig. 6 and illustrates the position of the projection 141 with respect to the selector reset bail 142 and the bifurcation 147 with the transfer bail 148. The transfer bail 148 is carried at the upper end of a vertical transfer lever 149, which is pivotally supported at its lower end on a shoulder screw 151 suitably supported from the frame. A cam follower 152 adjacent the center of the transfer lever 149 is held in operative relation with its associated transfer cam 61 by an attached spring 153. The operations of the bails 142 and 148 on a selector lever will hereinafter be described.

At some point in the revolution of the selector cam shaft 29, preferably near the end of a revolution thereof, the trip cam 81 thereon rotates to bring a notch 154 therein, Fig. 1, into operative relation with a cam follower 156 adjacent the center of an arm 158 of the trap lever 54. This allows a spring 157 attached to the substantially horizontal arm 158 of the trip lever 54 to pivot the same about its pivot 159 a slight amount in a clockwise direction. Such pivoting movement of the trip lever 54 releases the positive action clutch 46 on the operating cam shaft 26 to cause the rotation of the operating cam sleeve 42 in the manner pointed out above. As the trip lever 54 is only momentarily operated, the operating cam sleeve 42 is released for only one revolution at a time in conjunction with each revolution of selector cam shaft 29. Shortly after the operating cam sleeve 42 is released for rotation with the constantly rotating operating shaft 26 by the operation of the clutch 46, a hump on the transfer bar reset cam 62 rotates into operative relation with a cam follower 160 on a transfer bar reset lever 161, Figs. 1 and 5, to operate the same in a clockwise direction and then allows an attached spring 162 to pivot the same in a counter-clockwise direction and then allows an attached spring 162 to pivot the same in a counter-clockwise direction back into its normal position. The transfer bar reset lever 161 is pivotally mounted at 163 and carries at the upper end of the vertical arm thereof a transfer bar reset bail 164.

At the right of the transfer bar reset bail 164 are depending sections 166 at the right hand ends of transfer bars 167. The transfer bars 167 are disposed in vertical alignment with associated selectors 134 and are guided for longitudinal movement in the direction of their length by the bifurcated left hand ends engaging collars 165 on a stud 168 and the right hand ends engaging on their upper sides the collars on studs 140 and on their lower sides a stud 170. The above mentioned movement of the transfer bar reset bail 164 engages the projections 166 of all of the transfer bars 167 that happen to be in their left hand position, as positioned in accordance to the previous code combination and moves them to their right hand position. Thus all the transfer bars 167 are in their normal right hand position in preparation to having the settings of the selectors 134 transferred thereto. A transfer bar 167 is shown in its operated left hand position in Fig. 7 and in its unoperated right hand position in Figs. 5 and 6.

Shortly after the operation of the transfer bar reset bail 164 the transfer cam 61 causes the transfer lever 149 to pivot in a counter-clockwise direction and in so doing, the bail 148 at the upper end thereof, which is in engagement with the bifurcations 147 in the selectors 134 in unlatched positions, moves the same toward the left to selected operated positions. This leftward movement of the selectors 134 brings the left hand surfaces of projections 169 thereon into engagement with the right hand ends of associated transfer bars 167, to cause the associated transfer bars to also move toward the left into their left hand positions. Individual spring members such as 171 tend to prevent movement of the transfer bars 167 and tend to retain the same in either one of their operated positions. As clearly shown in Fig. 5 with a selector 134 in its latched position the bifurcation 147 does not straddle the transfer bail 148 and therefore the selectors 134 in latched positions are not operated by movement of the bail 148. Accordingly the transfer bars 167 associated with latched ones of selectors 134 are not moved on the transfer operation but remain set in their right hand positions. Thus by operation of the transfer bar reset bail 164 and transfer bail 148, the transfer bars 167 are fixed or set to their normal right hand position and then the setting of the selectors 134 transferred thereto, whereupon the transfer bars 167 assume a combination of settings in left and right hand positions representative of the character code just received.

The timing chart shown in Fig. 12 shows the preferred timing of the various cams on the operating cam sleeve 42 relative to their associated elements and it will be noted from Figs. 5 and 12 that there is a slight dwell in the transfer cam 61, following the hump or section of greatest radius thereof. This dwell is of slightly less radius than the hump of the transfer cam 61, and accordingly the selectors 134 being operated by the bail 148 will momentarily be stopped in their movement toward the right as the movement of the transfer bail 148 is momentarily stopped as it pivots back to its normal position. While the transfer lever cam follower 152 is in operative relation with the dwell on the transfer cam 61, the hump of the selector reset cam 60 engages its associated follower 144 to pivot the selector reset lever 145 in such a manner as to elevate the reset bail 142. During this movement of the reset bail 142 it engages the projections 141 of the unlatched selectors 134 and elevates the right hand ends thereof to bring the surfaces 133 thereon above the latching surfaces of the bifurcations 122 in the latches 117. This movement of the selectors 134 also disengages the bifurcations 147 from the transfer bail 148, whereupon the attached springs 138 move the selectors toward the right, and when the selector reset bar 142 subsequently moves downward back into its normal position, the surfaces 133 engage the upper surfaces of the bifurcations 122 in the latches 117 to be latched thereat in their normal latched positions. The movement of the selectors 134 toward the right a slight amount prior to the elevation of their right hand ends by the reset bail disengages them from the transfer bars 167 and prevents any binding thereat. The operation of the reset bail 142 occurs during the dwell on the transfer cam 61 and accordingly prior to the complete return of the transfer bail 148 to its normal position, therefore elevation of the right hand ends of the selectors 134 occurs before they are moved sufficiently to the right to bring the surfaces 133 into operative relation with the bottoms of the associated latches 117. Thus the selectors 134 are latched in their normal latched position without disturbing the selector latches 117 and there is no engagement between the selectors and the latches until the surfaces 133 engage the lower surfaces of the bifurcations 122 in the latches. Thus the latches 117 are not disturbed during the resetting of the selectors 134 as they would be if the selectors were moved to the right prior to the elevation of the right hand ends thereof. Such an arrangement has the advantage in that it permits rapid operation of the selectors 134 and no time is required between successive cycles of operation for the latches to settle down in their normal positions.

The transfer bars 167 control a typewheel stop unit which in turn controls the stop position of a typewheel. The typewheel stop unit shown in section in Fig. 4 is similar in construction to that shown and described in a U. S. patent to R. F. Dirkes et al., No. 2,174,731, issued October 3, 1939. In general the typewheel stop unit comprises the typewheel shaft 37 frictionally driven from the constantly rotating gear 33 through the action of a friction clutch indicated in general by reference numeral 172, the friction clutch 172 being similar in construction to the friction clutch 67, Fig. 2, employed to rotate the selector cam shaft 29. Surrounding the typewheel shaft 37 is a bushing 173 which is supported in a sleeve 174 and mounted on the sleeve 174 is a set of five code discs 176, together with a shift disc 177. The code discs 176 and 177 are rotatable within predetermined limits about the sleeve 174 in a manner hereinafter described and arranged around the peripheries thereof are notches, the arrangement of the notches in each code disc being different from that in each of the others. Cooperating with the notches in the code discs are stop members or bars 178, which are guided in radial slots in guide members 179 adjacent the ends thereof while associated springs 181 tend to move the stop members 178 toward the typewheel shaft 37.

At the upper side of the code discs 176 are radial slots 182 as shown in Figs. 1, 5 and 7, which engage the rounded depending projections 183 adjacent the left hand ends of associated transfer bars 167. The transfer bars 167 are in alignment with associated code discs 176 and as the transfer bars are moved from one position to the other, associated ones of the code discs 176 are rotated from one of their positions to the other. Accordingly, the code discs 176 assume a setting in combinations of their two positions corresponding to the setting of the transfer bars 167. For each setting of the code discs 176, a series of notches, one in each code disc, will be in alignment. This allows the stop member 178 associated therewith to enter into the row of aligned notches under the action of an associated spring 181. As a stop member 178 enters a row of aligned notches in the code discs, it pivots adjacent the right hand end thereof on a pivot plate 184, Fig. 4, to place the right hand end in the path of the end of a stop arm 186. The stop arm 186 is clamped to a hub 187 fixed on the typewheel shaft 37, and hence is rotatable with the typewheel shaft.

Normally the right hand ends of the stop members 178 are out of the path of the end of the stop arm 186 and when a stop member is selected by entering a row of aligned notches in the discs, the right hand end moves into the path of the stop arm 186 to stop the same thereat. Also fixed to the typewheel shaft 37 for rotation therewith is a typewheel 188, and depending upon which one the stop member 178 is selected the typewheel is stopped in any one of its selected angular positions. When the transfer bars 167 are moved to their normal right hand position as hereinabove described, the code discs associated with transfer bars in their left hand positions are also moved, and in doing so the stop member 178 previously selected is cammed back into its normal position by virtue of the slopes at the edges of the notches in the discs. This releases the typewheel shaft stop arm 186 whereupon it rotates under the action of the friction clutch 172 until it engages the stop member selected when the code discs 176 are moved in a combination of settings representative of the positions of the selectors 134. Thus the typewheel 188 is stopped in a selected angular position with a type element on the periphery thereof corresponding to the code group in printing position. The manner in which the printing operation, following the positioning of the typewheel is accomplished will hereinafter be described, together with the feeding of the recording tape.

The typewheel 188 has in a single row on the periphery thereof both upper and lower case characters and the position of the shift disc 177, Fig. 4, determines which will be recorded. The shift disc is positioned as described in the Dirkes et al. patent supra, in response to shift and unshift signals.

The printing and tape feed operations are controlled by their associated cams 57 and 58, Fig. 1, respectively and as hereinbefore stated, these cams are located on the operating cam sleeve 42 for rotation therewith to perform their associated operations during each cycle of operation of the sleeve. In operative relation with the tape feed cam 58 is a cam follower 189 carried at the end of the rightwardly extending arm of a feed lever 191. The feed lever 191 is in the shape of a bell crank and is pivotally mounted on a pin 192 supported from the frame. The leftwardly extending arm 193 of the feed lever 191 carries in the end thereof a shoulder screw 194. Pivotally mounted on the shoulder screw 194 is a bell crank 196 which has a depending arm 197 with a pawl or hook thereon normally held in engagement with the notches in a feed ratchet wheel 198 by a spring 195. The feed ratchet 198 is fixed for rotation therewith to a feed roller 199 over which a recording tape is arranged to pass. A pressure roller 201 on the free end of a spring biased lever 200 is held in engagement with the tape T passing over the feed wheel 199 and when the feed wheel is rotated, the tape is advanced. A spring 202 attached to the feed lever 191 holds the follower 189 against the periphery of its associated tape feed cam 58 to cause operation of the lever 191 as the cam rotates.

As shown in the timing chart, Fig. 12 of the various cams on the operating cam sleeve 42, the tape feed cam 58 oscillates the feed lever 191 to feed the tape soon after the selector reset cam 69 operates its associated bail, and following the feed operation, the print cam 57 operates a print lever 207 to perform the printing operation. The print lever 207 is pivotally mounted on the pin 192 and has attached thereto the spring 202 which holds a cam follower 211 at the end of the vertically extending arm in contact with the periphery of the print cam 57. The print lever 207 has at the end of the leftwardly extending arm thereof a print hammer 212 which is adapted to pass through a hole 213 in a tape guide 214 to force the tape against the typewheel each time the cam 57 allows the print lever to oscillate. The typewheel 188 is selectively stopped as hereinbefore described with a character thereon corresponding to the received code group over the print hammer 212 and, as the tape is pressed thereagainst by the print hammer 212, the character is recorded on the tape, the typewheel being inked by an absorbent ink roller, not shown, in a manner well known in the art. Thus in conjunction with each revolution of the operating cam sleeve 42, the settings of the selectors 134 are transferred to the code discs 176 through the instrumentality of the transfer bars 167 to stop the typewheel in the selected angular position whereupon the corresponding character is recorded upon the tape, the tape being advanced previous to the printing operation to move the previously recorded character from beneath the typewheel 188.

Also rotatable with the operating cam 42 is a notched disc 59 which cooperates with a spring biased lever 216 to prevent rotation of the operating cam sleeve 42 in a reverse direction when brought to rest at the end of each revolution. Actually the notched disc 59 is positioned between the tape feed cam 58 and the selector reset cam 60 as shown in Fig. 2. However, in Fig. 1 for the sake of simplifying the drawing, the notched disc 59 is shown at the right of the transfer lever reset cam 62.

During receipt of certain signals such as shift, unshift, blank, etc., it is desirable not to feed the tape and in order to accomplish this, the downwardly projecting portion 197 of the feed pawl 196 is withdrawn from engagement with the feed ratchet wheel 198 during cycles of operation corresponding to predetermined code signals. Three stop members 178a, 178b and 178c of the stop unit are arranged to be selected in response to predetermined signals, such as the shift, unshift, blank, etc. These stop members have projecting from the movable ends thereof extensions 217 which extend past the right hand side of an arm 204, adjustably attached by screws 205 to a bell crank 206 pivotally mounted at 209. Whenever any one of the stop members 178a to 178c is selected, the extensions 217 thereof engage the arm to cause the bell crank 206 to pivot a slight amount in a counter-clockwise direction and place the upper end of the left hand arm of the bell crank 206 beneath the end of the rightwardly extending arm of the bell crank 196. This operation occurs prior to the operation of the feed lever 191 and when the feed lever does operate to lower the bell crank 196, the rightwardly extending arm thereof engages the upper end of the left hand arm of the bell crank 206 and causes the arm 197 or pawl to move away from the ratchet wheel 198. Accordingly for such an operation of the feed lever 191 the ratchet wheel 198 is not stepped and the tape T will not be advanced. If the next signal is a character representing signal the receipt thereof causes the return of the selected one of the special stop members 178a to 178c to its normal position whereupon an attached spring 211 is allowed to pivot the bell crank 206 to its normal position with the upper end of the left hand arm out of the normal path of movement of the rightwardly extending arm of the bell crank feed pawl 196. With the bell crank 206 in its normal position, the hook of the bell crank 196 is not pivoted away from the ratchet wheel 198 when operated by the feed lever 191 and therefore is allowed to engage the next tooth on the ratchet wheel to cause rotation of the same in conjunction with the character signal. The spring 211 biasing the bell crank 206 to its normal position may be very light and therefore put a very small load on the special stop members 178a to 178c when blocking out a feed operation. A pivoted spring biased retaining pawl 208 engages the ratchet wheel 198 to prevent rotation thereof in a reverse direction as the pawl 197 moves downward to pick up a lower tooth.

A section of the typewheel adapted to be positioned over the print hammer 212 when the stop arm 186 engages the special stop members 178a to 178c is cut away so that as the print hammer elevates the tape, no recording occurs thereon for the attendant cycle of operation. Thus the feeding operation of the tape may be blocked out for predetermined selective cycles of operation of the receiver and the instrumentalities for accomplishing this are simple in construction, reliable and positive in operation which constituted an important advantage in receivers of this type.

It will be obvious that various modifications of the invention may be made without departing from the spirit or essential attributes thereof and it is desired, therefore, that only such limitations be placed thereon as are imposed by the prior art or specifically set forth in the appended claims.

What is claimed is:

1. A telegraph receiver comprising a series of movable and normally latched selecting elements, a corresponding and associated series of latches therefor, means for operating said latches in marking and spacing cycles in accordance with received signals to selectively unlatch associated of said selecting elements, a plurality of notched code members each having normal and operated positions, means for simultaneously moving said notched code members to their normal position, and means operative thereafter engaging said unlatched selecting elements for simultaneously moving associated of said code members into operated positions in combinations according to the position of said selecting elements.

2. In a selector mechanism, a series of selector elements each having a normal latched position, an unlatched position and an operated position, resilient means for moving said elements from latched position to unlatched position, a first power operated means for simultaneously moving said elements from unlatched position to operated position and a second power operated means cooperating with said resilient means for simultaneously returning said elements from operated position to normal latched position, said selector actuating means operating in the order named.

3. In a selector mechanism, a group of selectors each having a normal latched position, an unlatched position and an operated position, an associated group of latches normally latching said selectors in normal position, means for selectively actuating said latches to unlatch associated selectors in accordance with received signal impulses during said signal impulses, individual resilient means for moving said unlatched selectors from normal to unlatched position, a first common power operated means for simultaneously moving said selectors from unlatched to operated position, a second common power operated means and means comprising said individual resilient means and said second common power operated means for simultaneously moving said selectors from operated to latched position.

4. In a selector mechanism, a group of selectors each having a normal latched position, an unlatched position and an operated position, an associated group of latches normally latching said selectors in normal position, means for selectively actuating said latches to unlatch associated selectors in accordance with received signal impulses during said signal impulses, individual resilient means for moving said unlatched selectors from normal to unlatched positions, as said selectors are unlatched, a power operated means simultaneously associated with said unlatched selector for positively moving such selectors from unlatched to operated position and concomitantly tensioning said resilient means, and means comprising said power operated means and said resilient means for thereafter simultaneously returning said selectors from operated to latched position.

5. In a telegraph receiver, a plurality of selector elements each having a normal and selected position, a latch individual to each of said selector elements normally latching said selector elements in a normal position, means responsive to received permutations of impulses for selectively actuating said latches to successively unlatch associated of said selector elements, individual resilient means for pivotally moving unlatched of said selector elements to a selected position, a recording mechanism and means employing only unlatched of said selector elements and simultaneously moving the same for selectively controlling said recording mechanism, means operative following the operation of said last mentioned means for simultaneously relatching unlatched of said selector elements and means whereby said selector elements in said relatching operation have a combined linear and pivoting movement.

6. In a selector mechanism, a plurality of selectors each having a normal latched position, a selected unlatched position, a selected operated position and an intermediate resetting position, a plurality of latches, one individual to each of said selectors and normally latching the same in latched position, means responsive to received permutations of impulses for selectively and successively operating said latches to unlatch said selectors, a first means for sequentially moving said unlatched selectors to said selected unlatched position, a second means for simultaneously moving said selectors from said selected unlatched position to said selected operated position, a third means for simultaneously moving said selectors from said selected operated position to said intermediate resetting position, a recording means and means controlled by said selectors in moving from said unlatched position to said selected operated position for selectively controlling said recording means.

7. In a cyclically operable printing telegraph receiver, a plurality of selectors, a plurality of latches one individual to each of said selectors and normally latching the same in latched position, means responsive to received permutations of impulses for selectively operating said latches to unlatched associated selectors, a rotatable member, a first group of means operable by said rotatable member for operating unlatched of said selectors through a plurality of movements, a recording mechanism including a typewheel selectively positioned under control of said selectors in said plurality of movements, a recording medium and a second group of means operable by said rotatable member for recording on said medium from said typewheel and advancing the same for each cycle of operation of said receiver.

8. In a telegraph receiver, a plurality of latches, a plurality of selectors one for each latch and normally latched in normal position thereby, signal responsive means for selectively controlling the actuation of said latches to unlatch associated selectors, a set of notched code members one for each selector and having normal and operated positions, a set of selectable members associated with said notched code members, said selectable members being selected by notches in said code members, a rotatable member, means operated by said rotatable member for moving said notched code members into normal and operated positions in accordance with the selective operation of said latches, a recording mechanism selectively controlled by said selectable members and operated by said rotatable member and means controlled by the selection of predetermined of said selectable members for rendering predetermined functions of said receiving mechanism ineffective on the rotation of said rotatable member.

9. In a telegraph receiver, a plurality of latches, a plurality of selectors one individual to each of said latches, each of said selectors having a plurality of positions and normally latched in normal position by associated latches, a set of transfer members one individual to each of said selectors, means responsive to received permutations of signal impulses for selectively operating said latches to unlatched associated selectors, individual resilient means for moving unlatched of said selectors to unlatched position, a rotatable member with a plurality of separate disc cams rotatable therewith, said rotatable member normally being at rest and released for one revolution at a time in conjunction with the receipt of each permutation group of signals, means operated by one disc cam on said rotatable member for simultaneously moving all of said transfer members to a normal position, means operated by another disc cam on said rotatable member for simultaneously moving unlatched of said selectors to transfer the setting thereof to said transfer members and means operated by still another disc cam on said rotatable member and cooperating with said individual resilient means for simultaneously moving said transferringly moved selectors back to said normally latched position.

10. In a telegraph receiver, a plurality of latches, a plurality of selectors one individual to each of said latches, each of said selectors having a plurality of positions and normally latched in normal position by associated latches, a set of transfer members one individual to each of said selectors, means responsive to received permutations of signal impulses for selectively operating said latches to unlatched associated selectors, individual resilient means for moving unlatched of said selectors to unlatched position, a rotatable member with a plurality of cams rotatable therewith, said rotatable member normally being at rest and released for one revolution at a time in conjunction with the receipt of each permutation group of signals, means operated by one cam on said rotatable member for simultaneously moving all of said transfer members to a normal position, means operated by another cam on said rotatable member for simultaneously moving unlatched of said selectors to transfer the setting thereof to said transfer members, means operated by still another cam on said rotatable member and cooperating with said individual resilient means for simultaneously moving said transferringly moved selectors back to said normally latched position, a recording mechanism selectively controlled by said transfer members including a print hammer and a tape advancing mechanism, a recording tape and means operated by cams on said rotatable member for operating said print hammer and said tape advancing means to record characters on said tape corresponding to received permutation groups of signals and advancing the same in conjunction with each received permutation group of signals.

11. In a telegraph receiver, a plurality of latches, a plurality of selectors one for each latch and normally latched in normal position thereby, signal responsive means for selectively controlling the actuation of said latches to unlatch associated selectors, a set of notched code members one for each selector and having normal and operated positions, a set of selectable members associated with said notched code members, said selectable members being selected by notches in said code members, a rotatable member, means operated by said rotatable member for moving said notched code members into normal and operated positions in accordance with the selective operation of said latches, a rotatable typewheel, means controlled by said selectable members for selectively positioning said typewheel, a recording tape, a recording tape feeding means including a ratchet wheel and a cooperating pawl, said pawl normally being in engagement with said ratchet wheel and invariably operated by said rotatable member and means operated by the selection of predetermined of said selectable members for removing said pawl from engagement with said ratchet wheel on the invariable movement thereof whereby said tape is not advanced for the associated operation of said rotatable member.

12. In a cyclically operable telegraph receiver, a set of latches, a corresponding set of selectors having a plurality of positions and normally latched in a normal position by said latches, means for selectively operating said latches in accordance with received signals to unlatch associated selectors, a transfer bail normally out of operation with said selectors with the same in latched position, means for successively moving unlatched of said selectors into operative relation with said transfer bail, means operative thereafter to actuate said transfer bail to simultaneously transferringly move unlatched of said selectors, a selector reset bail, means for operating said selector reset bail following the transferring movement of said selectors to simultaneously disengage said selectors from said transfer bail and initiate the movement of said selectors back into normal latched position.

13. In a cyclically operable telegraph receiver, a set of latches, a corresponding set of selectors having a plurality of positions and normally latched in a normal position by said latches, means for selectively operating said latches in accordance with received signals to unlatch associated selectors, a transfer bail normally out of operation with said selectors with the same in latched position, individual resilient means for successively moving unlatched of said selectors into operative relation with said transfer bail, means operative thereafter to operate said transfer bail to simultaneously move unlatched of said selectors to a transferring position and simultaneously tension said individual resilient means, a selector reset bail and means including said reset bail and said individual resilient means for simultaneously moving transferringly positioned of said selectors out of engagement with said transfer bail and back into normal latched position.

14. In a cyclically operable telegraph receiver, a set of latches, a corresponding set of selectors having a plurality of positions and normally latched in a normal position by said latches, means for selectively operating said latches in accordance with received signals to unlatch associated selectors, a transfer bail normally out of operation with said selectors with the same in latched position, individual resilient means for successively and pivotally moving unlatched of said selectors into operative engagement with said transfer bail, means operative thereafter including said transfer bail for simultaneously linearly moving unlatched of said selectors to a transferring position and simultaneously tensioning said resilient means, a selector reset bail, means including said selector reset bail and said individual resilient means for simultaneously moving said transferringly operated selectors in combined pivoting and linear movement out of engagement with said transfer bail and into normal latched position and means for controlling the pivoting and linear movement of said selectors into normal latched position so that said selectors engage associated latches only when in latching engagement therewith.

15. In a cyclically operable telegraph receiver, a set of latches, a corresponding set of selectors having a plurality of positions and normally latched in a normal position by said latches, a set of transfer levers, one for each of said selectors and having normal and operated positions, a transfer bail, said selectors in normal latched position being out of operative engagement with said transfer bail and said transfer levers, means for selectively operating said latches in accordance with received signals to unlatch associated selectors, individual resilient means for moving unlatched of said selectors from said latched position into selected position, said selectors in said selected position being in operative engagement with said transfer bail and associated ones of said transfer levers, a transfer lever reset bail, means including said transfer lever reset bail to move said transfer levers to normal position, means operative thereafter including said transfer bail to simultaneously move said selectively positioned selectors into engagement with associated of said transfer levers to move the latter to operated positions, the movement of said selectors by said transfer bail being a predetermined distance in one direction to perform a transfer operation and simultaneously tension said individual resilient means, means controlled by said transfer bail to permit said individual resilient means to thereafter move said selectively positioned selectors a fractional part of said transferring movement in a reverse direction to disengage said selectors from said transfer levers, a selector reset bail and means including said reset bail and said individual resilient means to simultaneously move said selected selectors to normal latched position.

16. In a cyclically operable telegraph receiver, a set of notched code members, said members being operable into permuted settings in one or the other of two positions in accordance with received signals once for each cycle of operation of said receiver, a plurality of selectable members selected by rows of notches in said notched code members, a rotatable typewheel selectively positioned by the selection of said selectable members, a recording medium advancing means including a toothed member and an operating element therefor, said operating element normally being in engagement with said toothed member and invariably operated for each cycle of operation of said receiver, an abutment for said operating member and means controlled directly by predetermined of said selectable members for selectively positioning said typewheel and positioning said abutment whereby said operating element is withdrawn from engagement with said toothed member during and by the invariable movement thereof to disable said recording medium advancing means for the attendant cycle of operation of said receiver.

17. In a telegraph receiver, a set of notched code members selectively positioned in accordance with received signals, a set of selecting members selected by said code members, a receiving mechanism selectively controlled by said selecting members including a cyclically operable web feeding means for advancing a web, means controlled by the selection of predetermined of said selecting members and dependent upon the operation of part of said web feeding means for disabling the same to advance said web for cycles of operation in which the predetermined of said selecting members are selected.

18. In a selector mechanism, a series of selector elements each having a normal position, a partially operated position and a fully operated position, resilient means for moving said elements from said normal position to said partially operated position, a first power operated means for moving said elements from said partially operated position to said fully operated position, a second power operated means, and means including said second power operated means and said resilient means for simultaneously moving said elements from said fully operated position directly to said normal position without passing through said partially operated position, said selector element actuating means operating in the order named.

19. In a selector mechanism, a series of selector elements each having a normal position, a partially operated position and a fully operated position, resilient means for pivotally moving said elements from normal position to partially operated position, a first power operated means for linearly moving said elements simultaneously from partially operated position to fully operated position against the action of said resilient means each means invariably tends to return said elements from fully operated position to partially operated position, and a second power operated means cooperating with said resilient means for returning said elements in a combined pivoting and linear movement from partially operated position to normal position.

20. In a selector mechanism, a plurality of selectors, a plurality of latches, one individual to each of said selectors and normally latching said selectors in a latched position, means responsive to received permutations of impulses for selectively operating said latches to unlatch associated selectors, individual resilient means for pivoting unlatched of said selectors to unlatched position, a first power operated means for simultaneously linearly moving unlatched of said selectors from said unlatched positions to a transferring position and a second power operated means for simultaneously moving said transferringly operated selectors to a preliminary resetting position, and means including said resilient means for then linearly moving said selectors simultaneously back into latching relation with said latches.

21. In a selector mechanism, a plurality of selectors each having a selected and an unselected position, a plurality of latches, one individual to each of said selectors and normally latching the same in unselected position, means responsive to received permutations of impulses for selectively operating said latches successively to unlatch said selectors, means for simultaneously moving unlatched of said selectors to a selected position through a first path of movement and means operative thereafter for simultaneously returning said selectively operated selectors from their selected positions to said unselected position through a second path of movement, said second path of movement being different from said first path of movement.

22. In a selector mechanism, a plurality of selectors, a plurality of latches, one individual to each of said selectors and normally latching the same in a latched position, means responsive to received permutations of impulses for selectively and successively operating said latches to unlatched associated selectors, a first means for pivoting unlatched of said selectors at the time of unlatching to an unlatched position, a second means for simultaneously and linearly moving unlatched of said selectors to a transferring position, a third means for simultaneously pivoting said unlatched selectors to a preliminary resetting position means including said first means thereupon operative to simultaneously and linearly move said selectors back into latching position.

23. In a selector mechanism, a plurality of selectors each having a plurality of positions, a plurality of latches, one individual to each of said selectors and normally latching the same in normal position, means responsive to received permutations of impulses for selectively and sequentially operating said latches to unlatch said selectors, means operative on said unlatched selectors for moving the same through said plurality of positions, said last means including power operated cams and resilient means for moving said selectors in a predetermined order of movement so that they occupy said plurality of positions only once for each cycle of operation and means for controlling the application of said selector moving means so that the movement of said selectors into some of said positions are performed sequentially and the movement into others of said positions are performed simultaneously.

24. In a telegraph receiver, a plurality of latches, a plurality of selectors one individual to each of said latches, said selectors having a plurality of positions and normally latched in normal position by associated latches, a first rotatable member, an electroresponsive device, means including said first rotatable member and said electroresponsive device for selectively operating said latches to unlatch associated selectors, individual resilient means effective on unlatched of said selectors to move the same to unlatched position, a second rotatable member, means operated by said second rotatable member and including said individual resilient means for simultaneously moving all unlatched of said selectors from said unlatched position successively through the remainder of said positions and back into said normal latched position, a recording means selectively controlled by said unlatched selectors in moving through said plurality of positions and other means operated by said second rotatable member for operating said recording means in accordance with the control thereof by said selectors.

25. In a telegraph receiver, a plurality of latches, a plurality of selectors one individual to each of said latches, each of said selectors having a plurality of positions and normally latched in normal position by associated latches, a set of transfer members one individual to each of said selectors, means responsive to received permutations of signal impulses for selectively operating said latched to unlatched associated selectors, individual resilient means for moving unlatched of said selectors to unlatched position, a rotatable member with a plurality of cams rotatable therewith, said rotatable member normally being at rest and released for one revolution at a time in conjunction with the receipt of each permutation group of signals, means operated by said cams on said rotatable member for simultaneously moving all of said transfer members to normal position, simultaneously moving the unlatched ones of said selectors to a transferring position to transfer the setting thereof to said transfer members and then simultaneously returning said transferringly moved selectors to said normally latched position, the movement of said unlatched selectors being in the order named with the transfer movement being such as to increase the tension in said individual resilient means and the movement of said selectors into normally latched position being assisted by said individual resilient means, printing means, means operable by said transfer members for controlling said printing means and means operable by other cams on said rotatable member for operating said printing means as controlled by said transfer members.

26. In a telegraph receiver, a plurality of latches, a plurality of selectors one for each latch and normally latched in normal position thereby, signal responsive means for selectively controlling the actuation of said latches to unlatch associated selectors, a set of notched code members one for each selector and having normal and operated positions, a set of selectable members associated with said notched code members, said selectable members being selected by notches in said code members, a rotatable member, means operated by said rotatable member for moving said notched code members into normal and operated positions in accordance with the selective operation of said latches, a rotatable typewheel, means controlled by said selectable members for selectively positioning said typewheel, a recording tape, a recording tape feeding means operated by said rotatable member to normally advance said tape a predetermined distance for each operation of said rotatable member and means operated by predetermined of said selectable members in addition to selectively positioning said typewheel for conditioning said tape feeding means to be rendered inoperative on the operation thereof by said rotatable member.

ROBERT F. DIRKES.
THOMAS E. MELICK.
VERNON R. KIMBALL.